Aug. 26, 1952     H. W. JOHNSON     2,608,231
TIRE CHAIN APPLIER
Filed Aug. 5, 1950
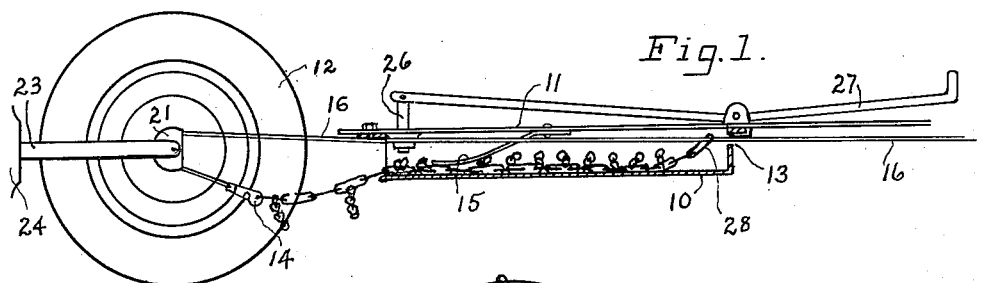
Fig. 1.
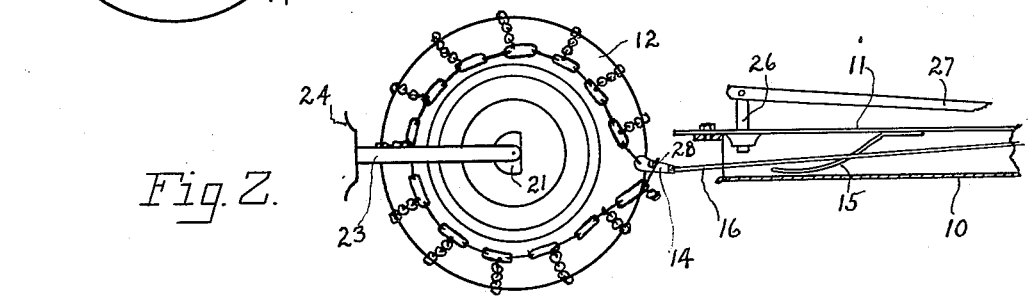
Fig. 2.
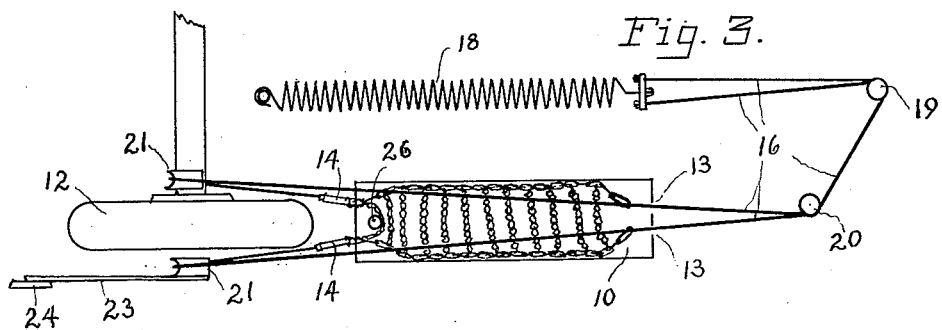
Fig. 3.
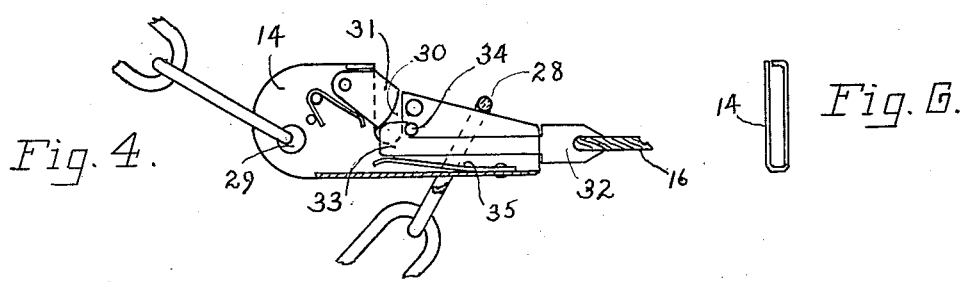
Fig. 4.     Fig. 5.     Fig. 6.
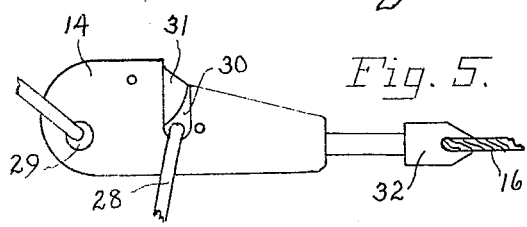
INVENTOR.
HOWARD W. JOHNSON
BY William R. Ballard
ATTORNEY.

Patented Aug. 26, 1952

2,608,231

UNITED STATES PATENT OFFICE 2,608,231

TIRE CHAIN APPLIER

Howard W. Johnson, Port Washington, N. Y.

Application August 5, 1950, Serial No. 177,839

6 Claims. (Cl. 152—214)

This invention is a device for automatically applying antiskid chains to the wheels of vehicles. Its object is to provide a mechanism for this purpose which is simple and inexpensive, which will apply a chain of conventional type and which will leave the chain free to "creep" on the tire when in use.

In the accompanying drawing, which illustrates one embodiment of my invention:

Fig. 1 is a side view partially in section showing the initial stage in the application of the chain;

Fig. 2 is a similar view showing the finishing stage in the application of the chain;

Fig. 3 is a semi-diagrammatic view of the complete equipment for one wheel viewed from above;

Fig. 4 is a sectional view showing the mechanism of the chain fastener and draw-cable release;

Fig. 5 is a side view of the same, showing position after the draw-cable has been released; and Fig. 6 is a transverse section of the frame of the chain fastener.

As indicated in Fig. 1, the tire chain is normally carried in a flat box-shaped support 10 which may be mounted on the under side of the running board 11 of a car, adjacent the wheel 12 to which the chain is to be applied—here assumed to be a rear wheel. The rear end of the supporting box is open to permit the chain to be drawn out. The other end of the box is closed except for two openings 13, 13 through which pass the draw cables hereinafter referred to. The support box is removably secured in place by bolts or clamps of any suitable known type. The chain is normally disposed on the support in orderly but compact array with the chain fasteners 14, 14 nearest to the wheel and the links at the other end of the chain placed at the other end of the support, as indicated in Fig. 1. A leaf spring 15 within the box is arranged to bear against the chain to somewhat retard its exit and prevent its being jerked from the support in a disorderly condition.

Flexible cables 16, 16 of wire or other suitable material are used to draw the chains from the support and against the wheel when the chains are to be applied, and, as the wheel turns, to bring the chain fasteners into exact register with the opening of the terminal link of the chain with which it is to be connected. For this purpose each cable is secured at one end to a source of power, here indicated for illustration as a helical spring 18, and after passing around pulleys 19 and 20 to bring it into line with the wheel and chain, it passes through an opening 13 in the support box. There it is threaded through the terminal link of one of the side strands of the chain and thence passes back and around a grooved cable guide 21, as shown in Figs. 1 and 3, and then passes forward again to the chain fastener 14 to which it is releasably attached. Although not essential, it is advantageous to have the cable guides 21 approximately concentric with the axis of the wheel as this serves better to hold the chain continuously against the tire while it is being applied. The inner guide is conveniently mounted on the axle housing, as indicated; the outer one may be carried on a support 23 attached to any convenient part 24 of the car body. In each instance the cable passes to the guide on the upper side and returns on the lower side of the guide. In this way as the chain is wrapped around the wheel from the lower side the cable is carried around and freed from the guide preparatory to its final release.

A slidable pin 26 passes through the support box just to the rear of the rearmost cross chain as it lies in the box and so normally prevents the spring and the cables from pulling the chain out of the support. A lever 27 under control of the operator, or other convenient mechanical means known to the art may be used to withdraw the pin 26 when it is desired to apply the chains.

The chain fasteners 14, which are located at one end of the chain in the usual manner, are of a generally flat tapered shape adapted to be drawn into the terminal links 28 on the other end of the chain. The fastener bodies may be formed from sheet metal by bending, as indicated in Fig. 6, to provide spaced side walls for supporting the internal mechanism. Each fastener has a slot 30 about midway of its length into which the terminal link drops when it reaches that point. This slot is normally closed by a spring pressed detent 31 which yields readily to permit the terminal link to enter the slot but prevents it from passing out again until the detent is forced back by hand in the process of removing the chain. The large end of the fastener is provided with an opening 29 in which the side strand of the chain is attached.

A connector 32 is attached to the end of each cable 16 and is provided with a shouldered extention 33 adapted to be inserted between the sidewalls of the fastener so that the shoulder will hook over the cross pin 34 of the fastener and will occupy the lower end of the slot 50 as shown in Fig. 4. It is held in this position by the spring 35 until the terminal link 28, dropping into the slot, forces the shoulder down below the pin 34, whereupon the pull of the power spring 18 withdraws the connector from the fastener and back into the support box. The outer or head end of the connector forms an extension of the tapered body of the fastener and is itself tapered to facilitate the threading on of the terminal link.

With the chain packed in the support box, the retaining pin 26 in place and the cables connected as above described, the chain may be applied to the wheel by merely withdrawing the pin 26 and driving the car forward for approximately one revolution of the wheels. Withdrawal of the pin 26 permits the draw cables to pull the chain out of the support until the first cross-chain is pressed firmly against the tire as shown in Fig. 1. As the car is then driven forward the friction of the tire will cooperate with the spring 18 to continue the withdrawal of the chain, causing it to be wrapped around the tire in proper working position until it reaches the position shown in Fig. 2. During this movement the terminal links 28 of the chain which are threaded on the cables slide along it until they reach the chain fasteners, and, riding along the tapered bodies thereof, drop into the slots 30 and are locked therein by the detents 31. The links 28, upon reaching the bottom of the slots release the connectors 32 as above described and these are then pulled back into the support box by the power spring 18 and lodge against its end wall at the openings 13. The chain is then fully applied and ready for use.

While I have shown the mechanism applicable to only one side of the car, it will be readily understood that the same mechanism is equally applicable to the other side and that the same spring 18 or other source of power may be used to activate both sides.

It will also be understood that many of the details of construction herein shown by way of illustrating the invention, may be varied considerably without departing from the spirit of the invention and the scope of the appended claims.

Having now described my invention, what I claim as new and desire to secure by Letters Patent is:

1. A device for applying antiskid chains to vehicle wheels, comprising a support for holding the chain adjacent the wheel, a source of power, a pair of draw-cables, and a pair of cable guides in a position to guide the cables from the chain support to the far side of the wheel axis and back, each draw-cable being connected at one end to a chain fastener located at one end of the chain and passing thence around one of said guides, thence through a terminal link on the other end of the chain, and having its other end connected to said source of power, and means for disconnecting the cable from the chain fastener when the chain has been applied to the wheel.

2. A device in accordance with claim 1 wherein the source of power is a spring under tension, and means under control of the operator for retaining the chain on the support against the tension of the spring.

3. A device in accordance with claim 1 having a drag attached to the support and bearing against the chain to control its movement from the support.

4. In a device of the kind described, a fastener for tire chains containing a latch for catching and holding the ends of the chain together, a connector for use in drawing the ends of the chain together, and mechanism within the fastener for releasably holding the fastener and connector together, said mechanism becoming automatically ineffective when the two ends of the chain are in connected position.

5. A tire chain applier for applying to a vehicle a tire chain having fasteners on one end thereof and conventional links on the other end thereof comprising a pair of draw-cables threaded through the conventional links of the chain and having on one end of each cable a connector releasably attached to a fastener on the opposite end of the chain.

6. A mechanism according to claim 5 in which the cable, between its points of contact with the conventional link and the fastener, is looped around the axis of said vehicle wheel at the start of the applying operation.

HOWARD W. JOHNSON.

REFERENCES CITED

The following references are of record in the file of this patent:

UNITED STATES PATENTS

| Number | Name | Date |
|---|---|---|
| 1,295,657 | White | Feb. 25, 1919 |
| 1,878,841 | Gause | Sept. 20, 1932 |
| 2,351,601 | Dabbs | June 20, 1944 |